(12) United States Patent
Liu et al.

(10) Patent No.: US 9,941,572 B2
(45) Date of Patent: Apr. 10, 2018

(54) NFC ANTENNA ASSEMBLY (71) Applicant: BYD COMPANY LIMITED, Shenzhen, Guangdong (CN)

(72) Inventors: Qiaoling Liu, Shenzhen (CN); Jiangang Zhou, Shenzhen (CN); Dajun Chen, Shenzhen (CN)

(73) Assignee: BYD Company Limited, Shenzhen, Guangdong (CN)

( * ) Notice: Subject to any disclaimer, the term of this patent is extended or adjusted under 35 U.S.C. 154(b) by 128 days.

(21) Appl. No.: 15/165,940

(22) Filed: May 26, 2016

(65) Prior Publication Data
US 2016/0268672 A1 Sep. 15, 2016

Related U.S. Application Data (63) Continuation of application No. PCT/CN2014/095022, filed on Dec. 25, 2014.

(30) Foreign Application Priority Data

Dec. 31, 2013 (CN) .......................... 2013 1 0754154
Dec. 31, 2013 (CN) ...................... 2013 2 0891483 U (51) Int. Cl.
| H01Q 7/08 | (2006.01) |
| H01Q 1/22 | (2006.01) |
| H01Q 7/00 | (2006.01) |
| H01Q 1/48 | (2006.01) |
| G06K 7/10 | (2006.01) |

(Continued)

(52) U.S. Cl.
CPC ....... H01Q 1/2208 (2013.01); G06K 7/10346 (2013.01); G06K 19/07771 (2013.01); G06K 19/07783 (2013.01); H01Q 1/1214 (2013.01); H01Q 1/48 (2013.01); H01Q 7/00 (2013.01)

(58) Field of Classification Search
CPC ...... H01Q 1/2208; H01Q 1/1214; H01Q 1/48; H01Q 7/00
See application file for complete search history.

(56) References Cited

U.S. PATENT DOCUMENTS

2012/0112971 A1    5/2012  Takeyama et al.

FOREIGN PATENT DOCUMENTS

| CN | 202651354 U | 1/2013 |
| CN | 103219579 A | 7/2013 |
| CN | 203967240 U | 11/2014 |

(Continued)

OTHER PUBLICATIONS

PCT International Search Report and Written Opinion dated Apr. 3, 2015, issued in corresponding International Application No. PCT/CN2014/095022 (12 pages).

Primary Examiner — Graham Smith
(74) Attorney, Agent, or Firm — Finnegan, Henderson, Farabow, Garrett & Dunner, LLP (57) ABSTRACT An NFC antenna assembly is provided. One embodiment of the NFC antenna assembly disclosed herein includes: a metal plate defining a fitting aperture which penetrates through the metal plate in a thickness direction of the metal plate; a mounting sheet disposed in the fitting aperture; an insulating washer disposed in the fitting aperture and surrounding the mounting sheet; and an NFC antenna disposed on the mounting sheet, wherein the mounting sheet comprises a first through slot extended in a radial direction of the mounting sheet, and the metal plate comprises a second through slot extended from the fitting aperture to a periphery of the metal plate.

16 Claims, 6 Drawing Sheets (51) Int. Cl.
*G06K 19/077* (2006.01)
*H01Q 1/12* (2006.01)

(56) References Cited

FOREIGN PATENT DOCUMENTS

| | | |
|---|---|---|
| JP | 4687832 B2 | 4/2009 |
| KR | 20100040257 A | 4/2010 |
| WO | WO 2013/115147 A1 | 8/2013 |
| WO | WO 2015/101213 A1 | 7/2015 |

Fig. 11

NFC ANTENNA ASSEMBLY

CROSS-REFERENCE TO RELATED APPLICATIONS

This application is a continuation of International Application No. PCT/CN2014/095022, filed on Dec. 25, 2014, which claims priority to and benefits of the following applications:

1) Chinese Patent Application No. 201310754154.5 filed with the State Intellectual Property Office of the People's Republic of China (SIPO) on Dec. 31, 2013, entitled "NFC ANTENNA ASSEMBLY"; and 2) Chinese Patent Application No. 201320891483.X filed with the State Intellectual Property Office of the People's Republic of China (SIPO) on Dec. 31, 2013, entitled "NFC ANTENNA ASSEMBLY".

The contents of the above-referenced applications are incorporated by reference herein in their entirety.

FIELD

The present disclosure generally relates to a field of near field communication (NFC), more particularly, relates to an NFC antenna assembly.

BACKGROUND

In existing technology, the structure of NFC antenna on metal shells has some problems, such as a large eddy-current loss, a relatively large volume and a short communication distance.

SUMMARY

Embodiments of the present disclosure seek to solve at least one of the problems existing in the prior art to at least some extent. One of the purposes of the present disclosure is to provide an NFC assembly with a long communication distance.

Embodiments of the present disclosure provide an NFC antenna assembly, which includes: a metal plate defining a fitting aperture which penetrates through the metal plate in a thickness direction of the metal plate; a mounting sheet disposed in the fitting aperture; an insulating washer disposed in the fitting aperture and surrounding the mounting sheet; and an NFC antenna disposed on the mounting sheet, wherein the mounting sheet comprises a first through slot extended in a radial direction of the mounting sheet, and the metal plate comprises a second through slot extended from the fitting aperture to a periphery of the metal plate.

With the NFC antenna assembly according to embodiments of the present disclosure, an eddy current is reduced by disposing the first through slot in the mounting sheet and disposing the second through slot in the metal plate, and magnetic lines of force are coupled to the metal plate which is equivalent to an amplifier, thus a magnetic flux is improved and the magnetic lines of force can pass through the fitting aperture, such that a communication distance is increased, a volume of the NFC antenna assembly is decreased and the cost is saved. In addition, the metal plate is insulated from the mounting sheet by disposing the insulating washer, thus improving safety in use.

In addition, the NFC antenna assembly according to some embodiments of the present disclosure further comprises following additional features.

In some embodiments of the present disclosure, the mounting sheet comprises a mounting hole, and the first through slot is extended from the mounting hole to a periphery of the mounting sheet.

In some embodiments of the present disclosure, an inner periphery of the insulating washer is abutted against the periphery of the mounting sheet.

In some embodiments of the present disclosure, the first through slot is configured as an enlongated slot formed in a lower part of the mounting sheet and extended in an up and down direction, a lower end of the first through slot is extended to a lower part of periphery of the mounting sheet, and an upper end of the first through slot is extended to the mounting hole.

In some embodiments of the present disclosure, the second through slot is configured as an enlongated slot extended in a longitudinal direction of the first through slot, a lower end of the second through slot is extended to the mounting hole, and an upper end of the second through slot is extended to an upper part of the periphery of the metal plate.

In some embodiments of the present disclosure, the NFC antenna includes: an antenna coil, connected with the mounting sheet; an antenna adhesive layer disposed between the antenna coil and the mounting sheet and configured to connect the antenna coil with the mounting sheet; a ferrite coating disposed on the antenna coil; and a ferrite coating adhesive layer disposed between the ferrite coating and antenna coil and configured to connect the ferrite coating with the antenna coil.

In some embodiments of the present disclosure, the antenna coil further includes a winding hole disposed at a center of the antenna coil, and the winding hole overlaps with the mounting hole disposed in the mounting sheet.

In some embodiments of the present disclosure, the NFC antenna further includes: a thin metal layer disposed between the antenna coil adhesive layer and the mounting sheet; and a thin metal layer adhesive layer disposed between the thin metal layer and the mounting sheet and configured to connect the thin metal layer with the mounting sheet.

In some embodiments of the present disclosure, the thin metal layer includes: a through hole; and a third through slot extended from the through hole to a periphery of the thin metal layer.

In some embodiments of the present disclosure, the winding hole at the center of the antenna coil overlaps with the mounting hole and the through hole.

In some embodiments of the present disclosure, the third through slot is configured as an enlongated slot extended in the up and down direction.

In some embodiments of the present disclosure, the third through slot is formed in an upper part of the thin metal layer, a lower end of the third through slot is extended to the through hole, and an upper end of the third through slot is extended to an upper part of the periphery of the thin metal layer.

In some embodiments of the present disclosure, the third through slot is extended in the longitudinal direction of the first through slot.

In some embodiments of the present disclosure, a thickness of the thin metal layer ranges from 10 μm to 100 μm.

In some embodiments of the present disclosure, an area of the thin metal layer is larger than that of the fitting aperture, and the periphery of the thin metal layer is disposed on the metal plate and has an insulated connection with the metal plate.

In some embodiments of the present disclosure, the periphery of the thin metal layer exceeds a periphery of the fitting aperture by a length of 2 mm-15 mm.

Additional aspects and advantages of embodiments of present disclosure will be provided in the following descriptions, or become apparent from the following descriptions, or be learned from the practice of the embodiments of the present disclosure.

BRIEF DESCRIPTION OF THE DRAWINGS

These and other aspects and advantages of embodiments of the present invention will become apparent and more readily appreciated from the following descriptions made with reference to the accompanying drawings, in which.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the specification, unless specified or limited otherwise, relative terms such as "central", "longitudinal", "lateral", "length", "width", "thickness", "up", "down", "front", "rear", "left", "right", "vertical", "horizontal", "top", "bottom", "inner", "outer", "clockwise", "counter clockwise" as well as derivative thereof should be construed to refer to the orientation or position as then described or as shown in the drawings under discussion. These relative terms are for convenience of description and do not require that components or devices of the present disclosure be constructed or operated in a particular orientation, and should not be construed to limit the scope of present disclosure.

In addition, terms such as "first" and "second" are used herein for purposes of description and are not intended to indicate or imply relative importance or significance or implicitly indicate quantity of the technical feature referred to. In the description of the present disclosure, "a plurality of" means two, or more than two, of the respective features, unless specified otherwise.

In the description, unless expressly described otherwise, terms concerning attachments, coupling and the like, such as "disposed", "connected", "interconnected", and "fixed", refer to a relationship in which structures are permanently secured onto each other, or detachably attached to one another; the connection could be through mechanical or electrical connection, directly connected or indirectly connected through intervening structures, or interconnected internally. Specific implications of the above phraseology and terminology may be understood by those skilled in the art according to specific contexts in the present disclosure.

An NFC antenna assembly 100 according to some embodiments of the present disclosure will be described in the following with reference to the drawings.

As shown in FIGS. 1-11, the NFC antenna assembly 100 according to some embodiments of the present disclosure includes: a metal plate 20, a mounting sheet 10, an insulating washer 30 and an NFC antenna 40. Specially, a fitting aperture 21 is formed in the metal plate 20 and is extended through the metal plate 20 in a thickness direction of the metal plate, the mounting sheet 10 is disposed in the fitting aperture 21, and the NFC antenna 40 is disposed on the mounting sheet 10. The insulating washer 30 is disposed in the fitting aperture 21 and surrounds the mounting sheet 10. The mounting sheet 10 includes a first through slot 12 extended in a radial direction of the mounting sheet 10, and the metal plate 20 includes a second through slot 22 extended from the fitting aperture 21 to a periphery of the metal plate 20.

With the NFC antenna assembly 100 according to embodiments of the present disclosure, an eddy current is reduced by disposing the first through slot 12 in the mounting sheet 10 and disposing the second through slot 22 in the metal plate 20; and magnetic lines of force are coupled to the metal plate 20 which is equivalent to an amplifier, and thus a magnetic flux is improved and the magnetic lines of force can pass through the fitting aperture 21, such that a communication distance is increased, a volume of the NFC antenna assembly 100 is decreased and the cost is saved. In addition, the metal plate 20 is insulated from the mounting sheet 10 by disposing the insulating washer 30, thus improving safety in use.

In some embodiments of the present disclosure, during assembly of an NFC antenna assembly 100 according to some embodiments of the present disclosure, the fitting aperture 21 and the second through slot 22 are formed in the metal plate 20 firstly, and the first through slot 12 is formed in the mounting sheet 10. Then the mounting sheet 10 is disposed into the fitting aperture 21 defined by the metal plate 20, and the insulating washer 30 is disposed into the fitting aperture 21 and surrounds the mounting sheet 10, so as to fix the mounting sheet 10. Finally, the NFC antenna 40 is fixed on the mounting sheet 10. A size of the insulating washer 30 is equal to that of a gap between the mounting sheet 10 and the fitting aperture 21, such that the insulating washer 30 can cover the gap completely so as to better fix the mounting sheet 10. There may be various connection means for connecting the NFC antenna 40 and the mounting sheet 10, such as a splicing connection.

Figure 1:
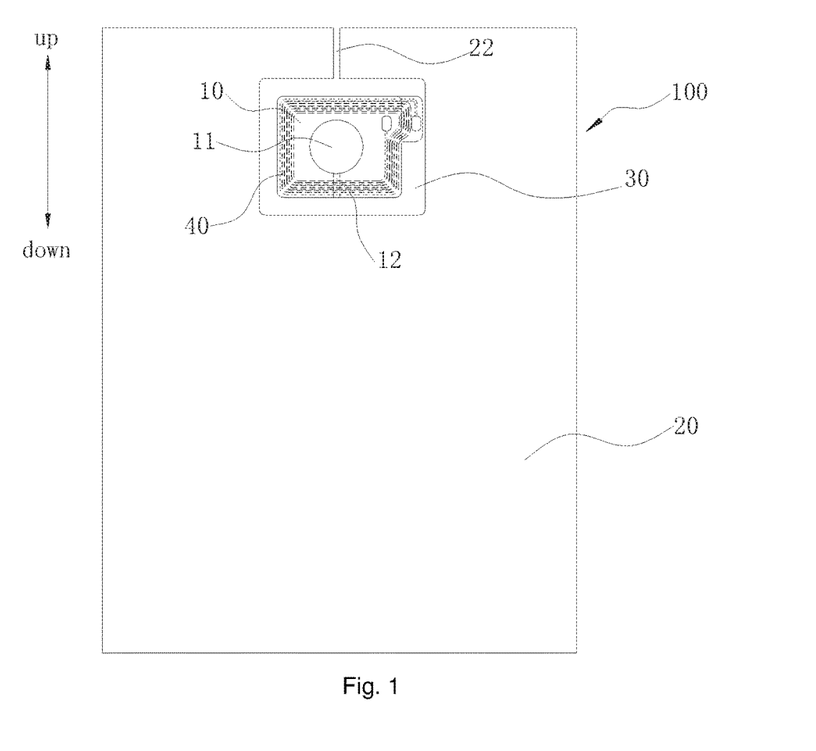
FIG. 1 is a schematic view of an NFC antenna assembly according to some embodiments of the present disclosure.
Figure 2:
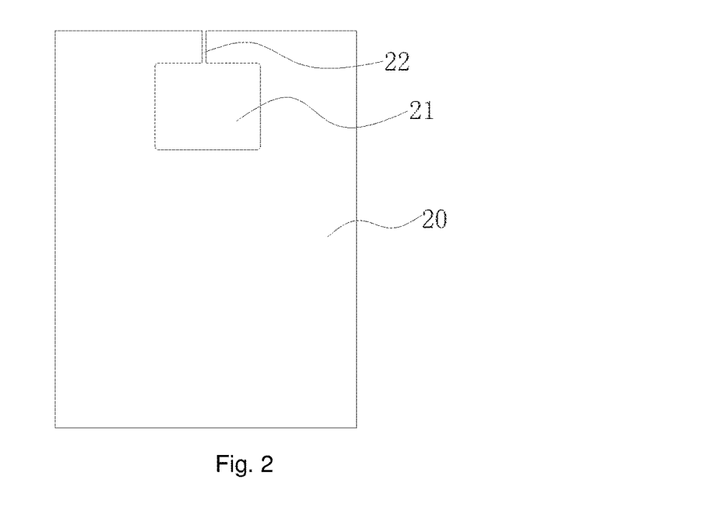
FIG. 2 is a schematic view of a metal plate of an NFC antenna assembly according to some embodiments of the present disclosure.

There's no special limitation to the structures of the mounting sheet 10 and the fitting aperture 21, in some embodiments of the present disclosure, a mounting hole 11 is formed in the mounting sheet 10, and the first through slot 12 is configured as a slot extending to the periphery of the mounting sheet 10 and the mounting hole 11. Furthermore, an inner periphery of the insulating washer 30 is abutted against the periphery of the mounting sheet 10. As shown in FIG. 2, the fitting aperture 21 in the metal plate 20 is configured as a rectangular hole, and a rectangular insulating washer 30 is abutted between an inner periphery of the fitting aperture 21 and the periphery of the mounting sheet 10, thus fixing the mounting sheet 10 in the fitting aperture 21. An end of the first through slot 12 in the mounting sheet 10 is extended to the mounting hole 11, and another end is extended to the insulating washer 30.

Figure 3:
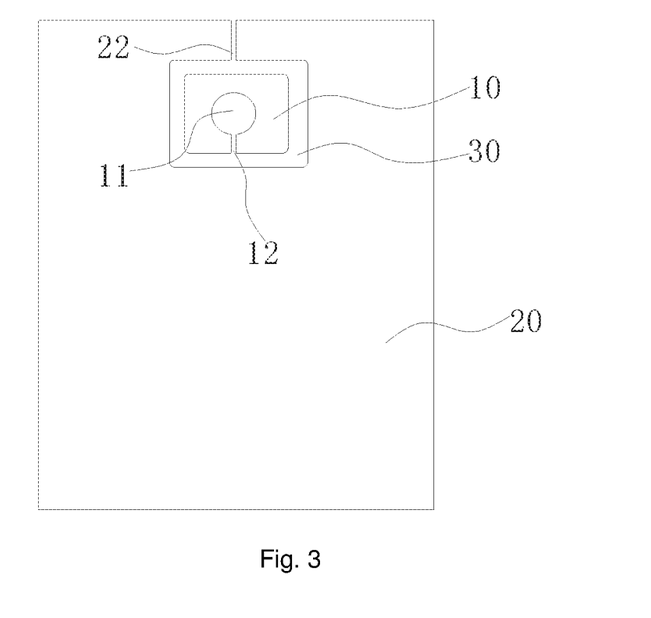
FIG. 3 is a schematic view of an NFC antenna assembly without an NFC antenna according to some embodiments of the present disclosure.
Figure 4:
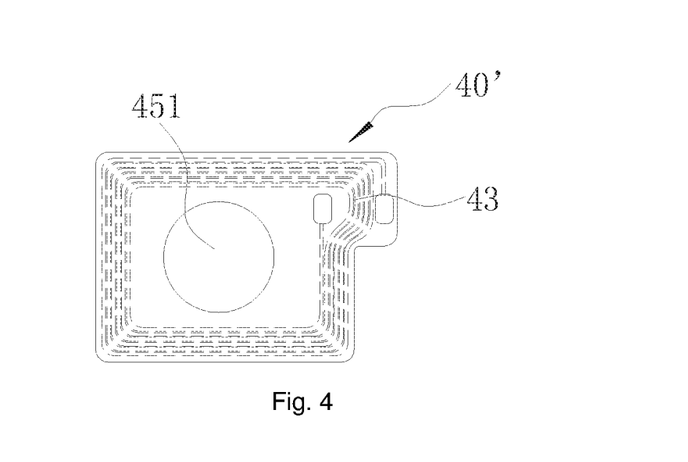
FIG. 4 is a schematic view of an NFC antenna of an NFC antenna assembly according to some embodiments of the present disclosure.
Figure 5:
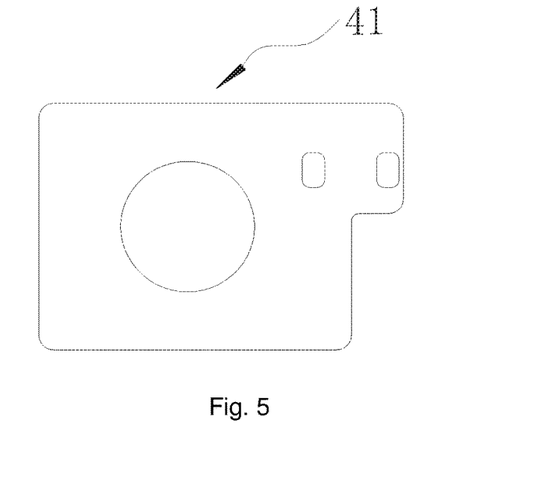
FIG. 5 is a schematic view of a ferrite coating of an NFC antenna assembly according to some embodiments of the present disclosure.
Figure 6:
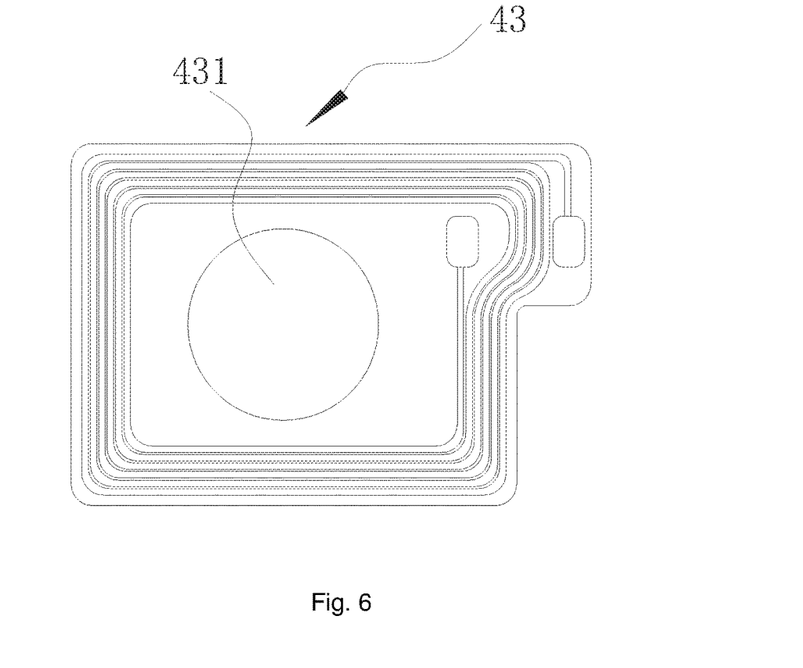
FIG. 6 is a schematic view of an antenna coil of an NFC antenna assembly according to some embodiments of the present disclosure.
Figure 7:
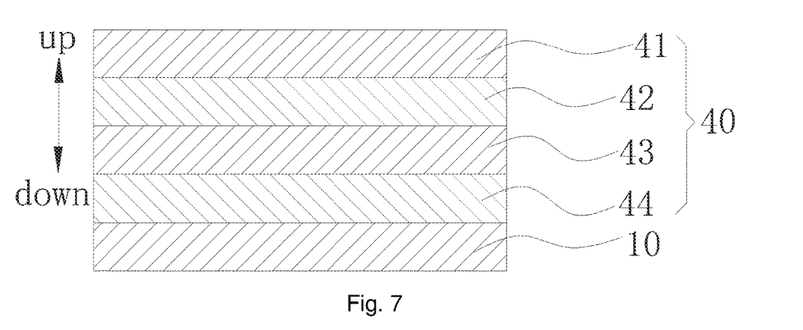
FIG. 7 is a sectional view of an NFC antenna assembly according to some embodiments of the present disclosure.

In some embodiments of the present disclosure, the mounting sheet 10 may be a metal sheet. When the NFC antenna assembly 100 according to some embodiments of the present disclosure is applied in a mobile phone, the metal plate 20 may be configured as a phone back cover, the NFC antenna 40 is disposed onto the phone back cover. Specifically, the NFC antenna 40 is disposed where a camera of the mobile phone is, and the mounting sheet 10 is configured as a camera metal plate. The camera is disposed in the fitting aperture 21 and is connected with a mainboard by welding. An end of the first through slot 12 is connected with the camera. A shape of the fitting aperture 21 may vary to match the structure of the camera. For example, the shape of the fitting aperture 21 may be a round (as shown in FIG. 3) or a rectangle.

There's no special limitation to the positions and the structures of the first through slot 12 and the second through slot 22. In some embodiments of the present disclosure, the first through slot 12 may be configured as an enlongated slot disposed in a lower part of the mounting sheet 10 and is extended in an up and down direction, a lower end of the first through slot 12 is extended to a lower part of the periphery of the mounting sheet 10 and an upper end of the first through slot 12 is extended to the mounting hole 11. In some embodiments of the present disclosure, the second through slot 22 may be configured as an enlongated slot extended in a longitudinal direction of the first through slot 12, a lower end of the second through slot 22 is extended to the mounting hole and an upper end of the second through slot 22 is extended to an upper part of the periphery of the metal plate 20. Therefore, the first through slot 12 and the second through slot 22 may be in different positions, thus an antenna with a relatively small volume can have a relatively large communication distance and the cost is saved. Moreover, the second through slot 22 and the first passage 12 are located along a same straight line, and thus an eddy current is further reduced and the performance of the NFC antenna 40 is improved.

In some embodiments of the present disclosure, the NFC antenna 40 includes: an antenna coil 43, an antenna adhesive layer 44, a ferrite coating 41 and a ferrite coating adhesive layer 42. Specially, the antenna coil 43 is connected with the mounting sheet 10. The antenna adhesive layer 44 is disposed between the antenna coil 43 and the mounting sheet 10 and is configured to connect the antenna coil 43 with the mounting sheet 10. The ferrite coating 41 is disposed on the antenna coil 43, and the ferrite coating adhesive layer 42 is disposed between the ferrite coating 41 and the antenna coil 43 and is configured to connect the ferrite coating 41 with the antenna coil 43. In other words, the NFC antenna 40 is configured as a laminated construction which includes the ferrite coating 41, the ferrite coating adhesive layer 42, the antenna coil 43 and the antenna coil adhesive layer 44 from top to bottom. The antenna adhesive layer 44 is connected with the mounting sheet 10.

In some embodiments of the present disclosure, the antenna coil 43 further includes a winding hole 431 at a center of the antenna coil 43, and the winding hole 431 overlaps with the mounting hole 11 in the mounting sheet 10. In other words, the winding hole 431 is disposed above the mounting hole 11, a size of the winding hole 431 may be larger than or equal to a size of the mounting hole 11, and preferably the center of the antenna adhesive layer 44 coincides with the center of the mounting hole 11 in the mounting sheet 10.

In some embodiments of the present disclosure, the antenna coil 43 may be a FPC antenna, and an appearance of the antenna coil 43 may vary, such as a square or a circle. An example of a square antenna coil 43 may be described as following: a biggest boundary dimension of the antenna coil 43 is 24.5 mm×17 mm, a coil turn number is 6, a line width is 0.3 mm, a distance between adjacent lines is 0.1 mm, and a copper thickness of coiling is 35 µm; a biggest boundary dimension of the ferrite coating 41 is 24.5 mm×17 mm; a diameter of the mounting hole 11 of the mounting sheet 10 is 9 mm, and a width of the first through slot 12 is 1 mm; a diameter of the winding hole 431 of the antenna coil 43 is 9 mm, a width of the third through slot 452 is 1 mm; a size of the fitting aperture 21 of the metal plate 20 is 28 mm×23 mm, and a width of the second through slot 22 is 1 mm.

The NFC antenna assembly 100 having the above dimension features and the camera are tested as following. In this test, the mounting sheet 10 is the camera metal plate and the metal plate 20 is the phone back cover. Type 1 is a main experiment, in which a first through slot is formed in the camera metal plate and a second through slot is formed in the phone back cover. Type 2 is a contrast experiment, in which the camera metal plate does not define a first through slot therein and a second through slot is formed in the phone back cover. A communication distance in a card reader mode with matching circuit is taken as an evaluation criterion, and results of the experiments are recorded in Table 1.

TABLE 1

| Type | Type description | Testing card | Communication distance in a card reader mode (mm) |
|---|---|---|---|
| 1 | a first through slot is formed in the camera metal plate + a second through slot is formed in the phone back cover | Mifare | 46 |
| 2 | the camera metal plate does not define a first through slot therein + a second through slot is formed in the phone back cover | | less than 11 |

As shown in Table 1, compared with the contrast experiment, Type 1 has a better performance. In other words, the first through slot formed in the camera metal plate reduces the eddy current and couples the magnetic lines of force to the metal plate which is equivalent to an amplifier, and thus the magnetic flux is improved and the magnetic lines of force can pass through the fitting aperture, such that the performance of the NFC antenna assembly 100 is improved, the volume of the NFC antenna assembly 100 is decreased and the cost is saved.

Figure 8:
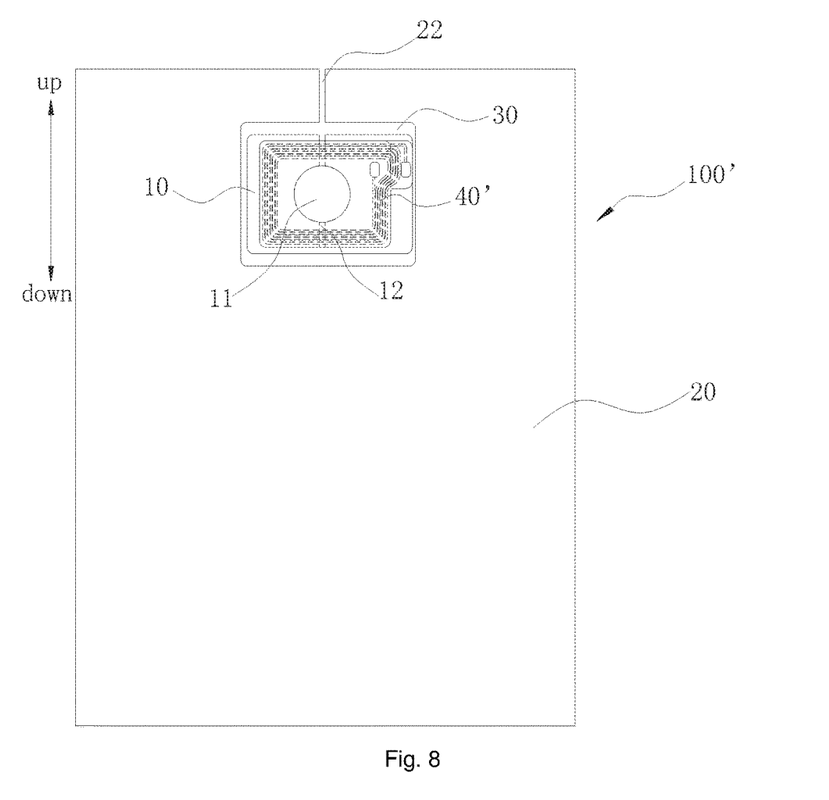
FIG. 8 is a schematic view of an NFC antenna assembly according to some embodiments of the present disclosure.
Figure 9:
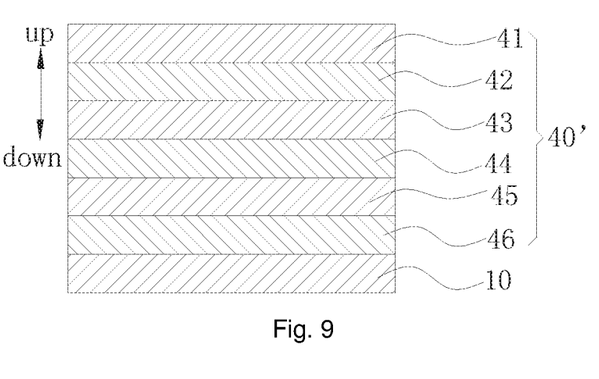
FIG. 9 is a sectional view of an NFC antenna assembly according to some embodiments of the present disclosure.
Figure 10:
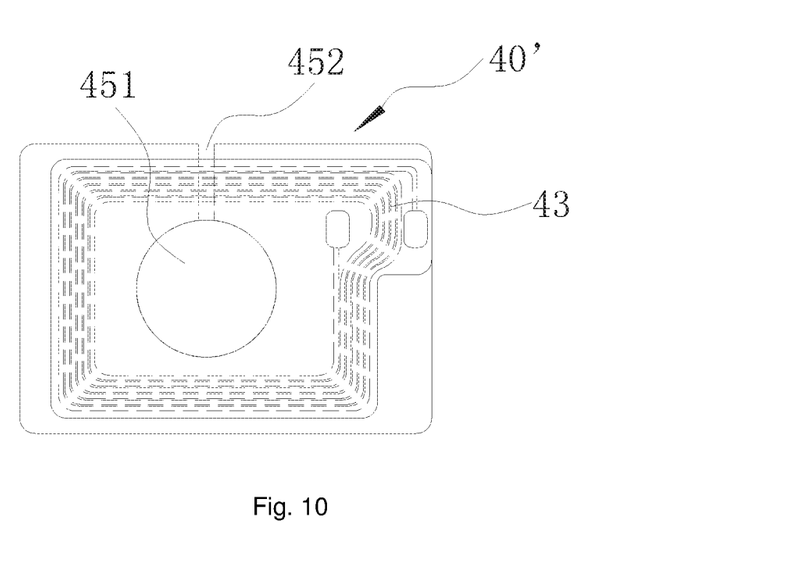
FIG. 10 is a schematic view of an NFC antenna of an NFC antenna assembly according to some embodiments of the present disclosure.

As shown in FIG. 8 and FIG. 9, in some embodiments of the present disclosure, an NFC antenna 40' further includes: a thin metal layer 45 and a thin metal layer adhesive layer 46. Specifically, the thin metal layer 45 is disposed between the antenna adhesive layer 44 and the mounting sheet 10. The thin metal layer adhesive layer 46 is disposed between the thin metal layer 45 and the mounting sheet 10. In other words, the NFC antenna 40' is configured as a laminated construction which includes the ferrite coating 41, the ferrite coating adhesive layer 42, the antenna coil 43, the antenna adhesive layer 44, the thin metal layer 45, and the thin metal layer adhesive layer 46 from top to bottom. The thin metal layer adhesive layer 46 is connected with the mounting sheet 10.

During assembly of the NFC antenna 40', a rolling process may be performed on the NFC antenna 40' to make the layers connected with each other tightly, and thus performance parameters of single NFC antenna 40' are consistent, a performance difference and a magnetic variation difference caused by inconsistent connection between the whole NFC antenna 40' and the mounting sheet 10 can be reduced, thus improving a stability of NFC antenna 40', improving production efficiency and saving the cost.

An area of the thin metal layer 45 may be slightly larger than that of the mounting sheet 10 and smaller than that of the fitting aperture 21. When the size of the fitting aperture 21 is large, the area of the thin metal layer 45 may be larger than that of the mounting sheet 10. In some embodiments of the present disclosure, the area of the thin metal layer 45 is larger than that of the fitting aperture 21, and the periphery of the thin metal layer 45 is disposed on the metal plate 20 and has an insulated connection with the metal plate 20. Specially, the periphery of the thin metal layer 45 exceeds the periphery of the fitting aperture 21 by a length of 2 mm-15 mm. In other words, the thin metal layer 45 covers the fitting aperture 21 completely and exceeds the fitting aperture 21 to cover a part of the metal plate 20 adjacent to the periphery of the fitting aperture 21, i.e., an covered area of the thin metal layer 45 on the metal plate 20 has a size of 2 mm-15 mm in a width direction or a length direction.

In some embodiments of the present disclosure, the thin metal layer 45 and the mounting sheet 10 may have the same or similar composition, and a thickness of the thin metal layer 45 may be 10 μm-100 μm. Therefore, when the thickness of the thin metal layer 45 of the NFC antenna 40' is increased, a whole thickness of the NFC antenna 40' is relatively thin.

Figure 11:
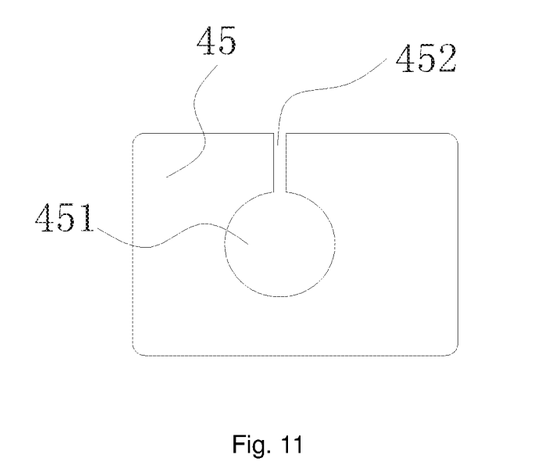
FIG. 11 is a schematic view of a thin metal layer of an NFC antenna assembly according to some embodiments of the present disclosure.

As shown in FIG. 11, the thin metal layer 45 defines a through hole 451 therein and a third through slot 452 extended from the through hole 451 to the periphery of the thin metal layer 45. The thin metal layer 45 may be configured as a rectangle matched with the mounting sheet 10. Specially, the winding hole 431 at the center of the antenna coil 43 overlaps with the mounting hole 11 and the through hole 451. The winding hole 431, the through hole 451 and the mounting hole 11 are disposed from top to bottom, an area of the winding hole 431 may be larger than or equal to that of the mounting hole 11 and that of the through hole 451, and preferably centers of the winding hole 431, the mounting hole 11 and the through hole 451 coincide with each other.

In some embodiments of the present disclosure, the third through slot 452 is configured as an enlongated slot extended in the up and down direction. The third through slot 452 may be formed in an upper part of the thin metal layer 45, a lower end of the third through slot 452 may be extended to the through hole 451, and an upper end of the third through slot 452 may be extended to an upper part of the periphery of the thin metal layer 45. In some embodiments of the present disclosure, the third through slot 452 may be extended in the longitudinal direction of the first through slot 12. Therefore, the eddy current is reduced and the magnetic lines of force can pass through the winding hole 431, the through hole 451 and the mounting hole 11, so as to increase the magnetic field variation quantity, and also the magnetic lines of force are coupled to the relatively big thin metal layer 45 and metal plate 20 which are equivalent to amplifiers. By disposing through slots in the metal plate 20, the mounting sheet 10 and the thin metal layer 45, the NFC antenna 40' with a relatively small volume may have a relatively large communication distance, and thus the cost is saved.

In some embodiments of the present disclosure, when an NFC antenna assembly 100' according to embodiments of the present disclosure is applied in a mobile phone, the metal plate 20 may be configured as a phone back cover, the NFC antenna 40' may be disposed onto the phone back cover where a camera of the mobile phone is disposed, and the mounting sheet 10 may be configured as a camera metal plate. The camera is mounted in the fitting aperture and is connected with the mainboard by welding. A structural relationship between the phone back cover and the camera may be described as following: a fitting aperture and a second through slot extended from the fitting aperture to a periphery of the phone back cover are formed in the phone back cover. A camera with a size smaller than that of the fitting aperture is disposed in the fitting aperture, an insulating washer 30 (such as a plastic component) is disposed between the fitting aperture and the camera to fix the camera within the fitting aperture, and the camera is welded onto the mainboard. A first through slot is formed in the camera metal plate, the NFC antenna 40' is disposed on the camera metal plate. Specially, the first through slot on the camera metal plate and the third through slot 452 on the thin metal layer 45 are formed along a straight line, with an angle difference of 180° and insulated from each other.

In some embodiments of the present disclosure, the appearance of the antenna coil 43 may vary, such as a square or a circle. An example of a square antenna coil 43 may be described as following: a biggest boundary dimension of the antenna coil 43 is 24.5 mm×17 mm, a coil turn number is 6, a line width is 0.3 mm, a distance between adjacent lines is 0.1 mm, and a copper thickness of coiling is 35 μm; a biggest boundary dimension of the ferrite coating 41 is 26.6 mm×19 mm; a diameter of the mounting hole 11 of the mounting sheet 10 is 9 mm, a diameter of the winding hole 431 of the antenna coil 43 is 9 mm, a width of the third through slot 452 is 1 mm; a size of the fitting aperture 21 of the metal plate 20 is 28 mm×23 mm, and a width of the second through slot 22 is 1 mm. In this case, the thin metal layer 45 has a larger area than the antenna coil 43 and does not cover the metal plate 20.

Another example of a square antenna coil 43 may be described as following, in which the thin metal plate 43 has a larger area than the antenna coil 43 and covers a part of the metal plate 20. Specially, the thin metal layer 45 has a boundary dimension of 38 mm×33 mm, the through hole has a diameter of 9 mm, the third through slot 452 has a width of 1 mm, and sizes of other parts are the same as those of the corresponding parts in the above example.

The NFC antenna assemblies 100' having the above two kinds of dimension features and a camera are tested as following. Type 1 and type 2 are main experiments. Specially, in type 1, a first through slot is formed in the camera metal plate, a third through slot 452 is formed in the thin metal layer 45, the area of the thin metal layer 45 is larger than that of the antenna coil 43 but smaller than that of the fitting aperture in the phone back cover; in type 2, the area of the thin metal layer 45 is larger than that of the antenna coil 43 and that of the fitting aperture 21, i.e., the thin metal layer 45 covers a part of the phone back cover. Type 3 is a contrast experiment, and in type 3, there's no through slot formed in the camera metal plate and the thin metal layer 45, but only a second through slot formed in the phone back cover. A communication distance in a card reader mode with matching circuit is taken as an evaluation criterion, and the results are recorded in Table 2.

TABLE 2

| Type | Type description | Testing card | Communication distance in a card reader mode (mm) |
|---|---|---|---|
| 1 | a first through slot is formed in the camera metal plate + a third through slot 452 is formed in the thin metal layer (the area of the thin metal layer 45 is larger than that of the antenna coil 43 but smaller than that of the fitting aperture in the phone back cover) + a second through slot is formed in the phone back cover | Mifare | 48 |
| 2 | a first through slot is formed in the camera metal plate + a third through slot 452 is formed in the thin metal layer (the area of the thin metal layer 45 is larger than that of the antenna coil 43 and that of the fitting aperture 21, i.e., the thin metal layer 45 covers a part of the phone back cover) + a second through slot is formed in the phone back cover | | 54 |
| 3 | there's no through slot in the camera metal plate + there is no thin metal layer 45 in the NFC assembly 40' + a second through slot is formed in the phone back cover | | less than 11 |

As shown in Table 2, the communication distance in type 2 is larger than that in type 1, i.e., when the thin metal layer 45 covers a part of the phone back cover, the communication distance of the NFC antenna assembly 100' is increased. Furthermore, experiments on a relationship between an area of the phone back cover covered by the thin metal layer 45 and the communication distance are performed, and it is found that when the area of the phone back cover covered by the thin metal layer 45 has a size of 2 mm-15 mm both in the width direction and in the length direction, the communication distance increases with an increase in the size of the area. Specially, when the area of the phone back cover covered by the thin metal layer 45 has a size of 2 mm-10 mm both in the width direction and in the length direction, there is a significant change in the communication distance.

In addition, by comparing type 1 with type 3 or type 2 with type 3, it's known that the communication distance in type 1 or type 2 is larger than that in type 3. That is to say, the first through slot formed in the camera metal plate reduces the eddy current, and couples the magnetic lines of force to the thin metal layer 45 which is equivalent to an amplifier, and further couples the magnetic lines of force to the phone back cover. Therefore, the magnetic flux is improved and the magnetic lines of force can pass through the fitting aperture and the mounting hole, such that the performance of the NFC antenna assembly 100' is improved and the cost is saved.

Other components and operations of the NFC antenna assembly 100 (100') according to embodiments of the present disclosure are known by those skilled in the related art and are not described herein.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure. Changes, alternatives, and modifications can be made in the embodiments without departing from the spirit, principles and scope of the present disclosure.

What is claimed is:
1. A NFC antenna assembly, comprising:
a metal plate defining a fitting aperture which penetrates through the metal plate in a thickness direction of the metal plate;
a mounting sheet disposed in the fitting aperture;
an insulating washer disposed in the fitting aperture and surrounding the mounting sheet; and
an NFC antenna disposed on the mounting sheet,
wherein the mounting sheet comprises a first through slot extended in a radial direction of the mounting sheet, and the metal plate comprises a second through slot extended from the fitting aperture to a periphery of the metal plate.

2. The NFC antenna assembly of claim 1, wherein the mounting sheet comprises a mounting hole, and the first through slot is extended from the mounting hole to a periphery of the mounting sheet.

3. The NFC antenna assembly of claim 2, wherein an inner periphery of the insulating washer is abutted against the periphery of the mounting sheet.

4. The NFC antenna assembly of claim 2, wherein the first through slot is configured as an enlongated slot formed in a lower part of the mounting sheet and extended in an up and down direction, a lower end of the first through slot extending to a lower part of periphery of the mounting sheet, and an upper end of the first through slot extending to the mounting hole.

5. The NEC antenna assembly of claim 4, wherein the second through slot is configured as an enlongated slot extended in a longitudinal direction of the first through slot, a lower end of the second through slot extending to the mounting hole, and an upper end of the second through slot extending to an upper part of the periphery of the metal plate.

6. The NFC antenna assembly of claim 4, wherein the NFC antenna comprises:
   an antenna coil, connected with the mounting sheet;
   an antenna coil adhesive layer disposed between the antenna coil and the mounting sheet and configured to connect the antenna coil with the mounting sheet;
   a ferrite coating disposed on the antenna coil; and
   a ferrite coating adhesive layer disposed between the ferrite coating and the antenna coil and configured to connect the ferrite coating with the antenna coil.

7. The NFC antenna assembly of claim 6, wherein the antenna coil further comprises a winding hole at a center of the antenna coil, and the winding hole overlaps with the mounting hole in the mounting sheet.

8. The NFC antenna assembly of claim 7, wherein the NFC antenna further comprises:
   a thin metal layer disposed between the antenna coil adhesive layer and the mounting sheet; and
   a thin metal layer adhesive layer disposed between the thin metal layer and the mounting sheet and configured to connect the thin metal layer with the mounting sheet.

9. The NFC antenna assembly of claim 8, wherein the thin metal layer comprises:
   a through hole; and
   a third through slot extended from the through hole to a periphery of the thin metal layer.

10. The NFC antenna assembly of claim 9, wherein the winding hole at the center of the antenna coil overlaps with the mounting hole and the through hole.

11. The NFC antenna assembly of claim 9, wherein the third through slot is configured as an enlongated slot extended in an up and down direction.

12. The NFC antenna assembly of claim 9, wherein the third through slot is formed in an upper part of the thin metal layer, a lower end of the third through slot extending to the through hole, and an upper end of the third through slot extending to an upper part of the periphery of the thin metal layer.

13. The NFC antenna assembly of claim 9, wherein the third through slot is extended in a longitudinal direction of the first through slot.

14. The NFC antenna assembly of claim 8, wherein a thickness of the thin metal layer ranges from 10 μm to 100 μm.

15. The NFC antenna assembly of claim 8, wherein an area of the thin metal layer is larger than an area of the fitting aperture, and the periphery of the thin metal layer is disposed on the metal plate and has an insulated connection with the metal plate.

16. The NFC antenna assembly of claim 15, wherein the periphery of the thin metal layer exceeds a periphery of the fitting aperture by a length of 2 mm-15 mm.

* * * * *

UNITED STATES PATENT AND TRADEMARK OFFICE
CERTIFICATE OF CORRECTION

PATENT NO. : 9,941,572 B2
APPLICATION NO. : 15/165940
DATED : April 10, 2018
INVENTOR(S) : Qiaoling Liu et al.

Page 1 of 1

It is certified that error appears in the above-identified patent and that said Letters Patent is hereby corrected as shown below:

On the Title Page

Item (30), in the Foreign Application Priority Data, Line 3:
"Dec. 31, 2013 (CN) ...... 2013 2 0891483 U" should read --Dec. 31, 2013 (CN) ...... 2013 2 0891483.X--.

Signed and Sealed this
Twenty-first Day of August, 2018

Andrei Iancu
*Director of the United States Patent and Trademark Office*